United States Patent [19]

Asawa et al.

[11] 4,298,699

[45] Nov. 3, 1981

[54] PROCESS FOR PRODUCING FLUORINATED POLYMER HAVING ION-EXCHANGE GROUPS

[75] Inventors: Tatsuro Asawa; Haruhisa Miyake, both of Yokohama; Masami Yamashita, Yokosuka; Yoshio Sugaya, Yokohama, all of Japan

[73] Assignee: Asahi Glass Company, Ltd., Tokyo, Japan

[21] Appl. No.: 119,521

[22] Filed: Feb. 7, 1980

[51] Int. Cl.³ .............................................. B01J 39/20
[52] U.S. Cl. ....................................... 521/31; 521/27
[58] Field of Search ..................................... 521/27, 31

[56] References Cited

U.S. PATENT DOCUMENTS 4,174,426 11/1979 Asami et al. ........................ 521/31

*Primary Examiner*—William F. Hamrock
*Assistant Examiner*—Peter F. Kulkosky
*Attorney, Agent, or Firm*—Oblon, Fisher, Spivak, McClelland & Maier

[57] ABSTRACT

A fluorinated copolymer having ion-exchange group is produced by copolymerizing a fluorinated ethylenic unsaturated monomer and a functional monomer having a functional group of carboxylic acid group or a group which can be converted to carboxylic acid group in an aqueous medium in the presence of a polymerization initiator source. The fluorinated copolymer obtained by the copolymerization is treated with an alcohol at higher than 20° C. in the form of particles before a molding. The melt flowability of the fluorinated copolymer is improved.

11 Claims, No Drawings

PROCESS FOR PRODUCING FLUORINATED POLYMER HAVING ION-EXCHANGE GROUPS

BACKGROUND OF THE INVENTION

1. Field of the Invention

The present invention relates to a process for producing a fluorinated polymer having ion-exchange groups. More particularly, it relates to an improved process for producing a fluorinated polymer having carboxylic acid type cation exchange groups by a copolymerization in an aqueous medium.

2. Description of the Prior Arts

It has been known that a cation exchange membrane of a carboxylic acid type fluorinated polymer is used as a membrane for partitioning in a membrane type electrolysis of an aqueous solution of an alkali metal chloride to produce an alkali metal hydroxide having high purity and to attain an operation at high current efficiency and high current density and also to produce an alkali metal hydroxide at high concentration in a cathode compartment.

The inventors have invented that a copolymer having high ion-exchange capacity and high molecular weight can be smoothly produced by copolymerizing a fluorinated olefin and a carboxylic acid type functional monomer in an aqueous medium at a desired ratio of the aqueous medium to the carboxylic acid type functional monomer and a pressure for the copolymerization. This is disclosed in U.S. Pat. No. 4,138,373 and U.K. Pat. No. 1,552,060 and Japanese Unexamined Pat. No. 49090/1978.

In accordance with the inventors' studies, the following problems of the resulting copolymers are found in the copolymerizations of a fluorinated olefin such as tetrafluoroethylene and a carboxylic acid type functional monomer in an aqueous medium.

When the resulting copolymer is molded into a film or a sheet in a heat-melting, the melt-viscosity of the copolymer is too high not to be easily molded. The difficulty of the moldability is not only depending upon the increase of the molecular weight, but also certain modification of a carboxylic acid type functional groups in the copolymerization in an aqueous medium in view of a result of the measurement of the molecular weight.

The inventors have further studied the above-mentioned copolymerization in view of the finding of these facts, and have found the following interest facts.

The copolymer obtained by an emulsion polymerization etc. is heated with an alcohol such as methanol whereby the melt-viscosity of the copolymer can be effectively lowered. The resulting copolymer is easily moldable into a film or a sheet by a melt-molding.

SUMMARY OF THE INVENTION

It is an object of the present invention to provide a process for producing a fluorinated polymer having ion-exchange groups which has relatively low melt-viscosity and is easily moldable by a melt-molding.

The foregoing and other objects of the present invention have been attained by copolymerizing a fluorinated ethylenic unsaturated monomer and a functional monomer having carboxylic acid group or a functional group which can be converted to carboxylic acid group, in an aqueous medium and contacting the resulting copolymer with an alcohol at higher than 20° C. In the treatment of the alcohol, the copolymer is preferably in a form of particles or coagulated granules (particle size of primary particles is depending upon the condition of the copolymerization) which are not melted after the copolymerization.

DETAILED DESCRIPTION OF THE PREFERRED EMBODIMENTS

In the process of the present invention, it is important to treat the copolymer obtained by the copolymerization in an aqueous medium with an alcohol.

The alcohol is preferably a lower alcohol especially methanol. The temperature in the treatment with an alcohol is usually higher than 20° C. preferably in a range of about 40° to 100° C. When the temperature is too low, the effect of the present invention is not attained. The time for the treatment with an alcohol is not critical. When it is too short, the effect of the treatment is not remarkable whereas when it is too long, the effect is not further improved to be disadvantageous in view of economy for the operation. Thus, it is usually in a range of 1 to 50 hours preferably 10 to 40 hours. When the temperature for the treatment is higher, the time for the treatment can be shorter.

The alcohol treatment is preferably carried out in the condition that the fluorinated copolymer is well and uniformly through into with the alcohol. For example, the fluorinated copolymer is stirred in a large amount of the alcohol. It is especially effective for treating the fluorinated copolymer in a form of granule. In the optimum process of the present invention, the fluorinated copolymer produced by the copolymerization can be obtained as a granule having small particle diameter less than $1000\mu$ by a coagulation-separation from a latex. Thus, the granular fluorinated copolymer is preferably treated with the alcohol. The amount of the alcohol is not critical. In view of a desired contacting condition, it is usual to use more than 100 ml. of the alcohol especially about 400 to 700 ml. per 100 wt. parts (g.) of the fluorinated copolymer.

In the process of the present invention, it is preferable to use the alcohol which contains less content of water. When the alcohol is recovered and reused, it is preferable to dehydrate in the recycling. It is also preferable to add a small amount of sulfuric acid in the system for the alcohol treatment. The melt-stability is improved by the addition of sulfuric acid. The melt-stability means a ratio of A/B wherein A represents a melt-viscosity in the pre-treatment and B represents a melt-viscosity in the post-treatment in the heat-treatment of the polymer at 230° C. for 1 hour. The melt-stability is higher depending upon that the value approaches to 1. A content of sulfuric acid is usually in a range of about 1 to 5 wt. parts per 100 wt. parts of the fluorinated copolymer. The alcohol treatment is preferably carried out in the presence of a small amount of sulfuric acid in the alcohol.

In the process of the present invention, a functional monomer having carboxylic acid group or a functional group which can be converted to carboxylic acid group is used as the functional monomer.

The carboxylic acid type functional monomer (I) is preferably a fluorovinyl compound from the viewpoints of the chlorine resistance and oxidation resistance of the resulting copolymer.

Suitable functional monomers are fluorovinyl compounds having the formula

wherein p is 0 or 1; l is 0 to 3; m is 0 to 1; n is 0 to 12; X represents —F, —Cl or —CF$_3$; X' represents —F or —CF$_3$; Y and Y' respectively represent —F or a C$_{1-10}$ perfluoroalkyl group; A represents —CN, —COF, —COOH, —COOR$_1$, —COOM or —COONR$_2$R$_3$; R$_1$ represents a C$_{1-10}$ alkyl group; R$_2$ and R$_3$ respectively represent —H or R$_1$; M represents an alkali metal atom or a quaternary ammonium group.

From the viewpoints of the property and availability, it is preferable to use the fluorovinyl compound having the above-mentioned formula wherein X and X' are —F; Y is —CF$_3$; Y' is —F; p is 0 or 1; l is 0 to 1; m is 0 to 1; n is 0 to 8.

From the viewpoint of the copolymerization reaction, it is preferable to use the fluorovinyl compound having the formula wherein A is —COOR$_1$ and R$_1$ is a C$_{1-5}$ alkyl group.

Typical fluorovinyl compounds include
CF$_2$=CFO(CF$_2$)$_{1-8}$COOCH$_3$,
CF$_2$=CFO(CF$_2$)$_{1-8}$COOC$_2$H$_5$,
CF$_2$=CF(CF$_2$)$_{0-8}$COOCH$_3$,
CF$_2$=CFOCF$_2$CF(CF$_3$)OCF$_2$CF$_2$CF$_2$COOCH$_3$,
CF$_2$=CFCF$_2$O(CF$_2$)$_4$COOCH$_3$,
CF$_2$=CFCF$_2$OCF$_2$CF$_2$OCF$_2$COOCH$_3$,
CF$_2$=CFCF$_2$OCF(CF$_3$)COOCH$_3$ and
CF$_2$=CFCF$_2$OCF(CF$_3$)CF$_2$OCF(CF$_3$)COOCH$_3$ In the copolymerization in an aqueous medium in the process of the present invention, the optimum result is attained by using monomer having —COOR$_1$ group as the functional monomer. That is, the fluorinated copolymers having units of functional groups having —COOR$_1$ group impart excellent moldability by the heat-melting and have the advantages of copolymerization reactivity. Moreover, the effect for improving the moldability by the alcohol treatment is remarkably high.

When a functional monomer having —COF, —CN, —COOH, —COOM or —CONR$_2$R$_3$ is used, the effect for improving the moldability by the alcohol treatment is also found.

Suitable fluorinated ethylenic unsaturated monomers (II) include C$_2$F$_4$, C$_2$F$_3$Cl, C$_3$F$_6$, C$_2$HF$_3$, C$_2$H$_2$F$_2$ and C$_2$H$_3$F.

The fluorinated ethylenic unsaturated monomers are preferably fluorinated olefins having the formula

CF$_2$=CZZ' wherein Z and Z' respectively represent —F, —Cl, —H or —CF$_3$. It is preferable to use a perfluoroolefine especially tetrafluoroethylene.

In the process of the invention, it is possible to use two or more types of the functional monomers (I) and the ethylenic unsaturated monomers (II), respectively.

It is also possible to add one or more other monomer such as an olefin compound (III) having the formula

CH$_2$=CR$_4$R$_5$ wherein R$_4$ and R$_5$ respectively represent —H, a C$_{1-8}$ alkyl group or an aromatic ring; a fluorovinyl ether having the formula CF$_2$=CFOR$_f$ wherein R$_f$ represents a C$_{1-10}$ perfluoroalkyl group; a divinyl monomer e.g. CF$_2$=CF—CF=CF$_2$ and CF$_2$=CFO(CF$_2$)$_{1-4}$OCF=CF$_2$ and the other functional monomers e.g. a sulfonic acid type functional monomer.

Suitable olefins (III) include ethylene, propylene, butene-1, isobutylene, styrene, α-methyl styrene, pentene-1, hexene-1, heptene-1, 3-methyl butene-1, 4-methyl pentene-1, etc.

From the viewpoints of the manufacture and property of the resulting copolymer, it is especially preferable to use ethylene, propylene, isobutylene, etc.

When a divinyl monomer or the like is added, the resulting copolymer is crosslinkable and the mechanical strength of the membrane made of the crosslinked copolymer is improved.

The ratio of the functional monomer (I), the fluorinated olefin (II), and the olefin compound (III) and the other component are important because it relates to characteristics of a cation exchange membrane for an electrolytic cell.

The content of the functional monomer (I) is important and directly relates to an ion exchange capacity and is preferably 1 to 50 mole %, preferably 3 to 35 mole %, especially 5 to 30 mole %.

When the content of the functional monomer (I) is too high, the resulting cation exchange membrane has disadvantageously low mechanical strength and low ion permselectivity caused by the increase of the water content.

When the content of the functional monomer (I) is too low, the ion exchangeable function is disadvantageously lost.

The fluorinated olefin (II), the olefin compound (III) and the other compound are the residual components in the copolymer. The content of the olefin (III) is important and relates to the electrical and mechanical properties and the chlorine resistance of the resulting cation exchange membrane.

Accordingly, when the olefin compound (III) is added, the molar ratio of the olefin compound (III) to the fluorinated olefin (II) is preferably 5/95 to 70/30, especially 10/90 to 60/40.

When the fluorovinyl ether or the divinyl ether is added, it is preferable to give a content of the fluorovinyl ether or the divinyl ether of less than 30 mole % preferably 2 to 20 mole % in the copolymer.

The ion exchange capacity of the copolymer can be in a range of 0.5 to 2.2 meq/g dry polymer. It is special characteristic that even though the ion exchange capacity is large, the molecular weight of the resulting copolymer can be high whereby the mechanical strength and durability of the copolymer can be high enough.

The ion exchange capacity is dependent upon the type of the copolymer in the above-mentioned range and is preferably more than 0.8 meq/g dry polymer, especially more than 1.0 meq/g dry polymer, from the viewpoints of the mechanical and electrochemical properties as the cation exchange membrane.

The molecular weight of the copolymer produced by the process of the invention is important and relates to the mechanical properties and the fabricatability of the cation exchange membrane.

When it is shown by the value of $T_Q$, it is usual to have $T_Q$ of higher than 150° C. preferably 170° to 340° C. especially about 180° to 300° C.

The term of $T_Q$ is defined as follows.

The term of $T_Q$ relates to a molecular weight of the copolymer and is a temperature to result a melt volumetric flow rate of 100 mm$^3$/second. The volumetric melt flow rate is a rate of the molten copolymer flowed out from an orifice having a diameter of 1 mm and a length of 2 mm at a specific temperature under the pressure of 30 kg/cm$^2$ and is shown by a unit of mm$^3$/second.

In the examples, an ion exchange capacity of a cation exchange membrane was measured as follows.

A H-type cation exchange membrane was immersed into 1 N—HCl at 60° C. for 5 hours to completely convert it to H-type membrane, and then the membrane was washed with water so as to be free of HCl. Then, 0.5 g of the H-type membrane was immersed into a solution prepared by adding 25 ml of water to 25 ml of 0.1 N—NaOH. Then, the membrane was taken out and the amount of NaOH in the solution was measured by a back titration with 0.1 N—HCl.

In the process of the present invention, it is important to carry out the copolymerization of the functional monomer and the fluorinated olefin in an aqueous medium. It is preferable to carry out the copolymerization by using an aqueous medium at a ratio of the aqueous medium to the functional monomer of less than 20/1 by weight preferably less than 10/1 by weight. When the amount of the aqueous medium is too much, the reaction velocity of the copolymerization is remarkably low. It takes a long time for obtaining high yield of the copolymer. Moreover, when the amount of the aqueous medium is too much, it is difficult to give high molecular weight in the case of high ion exchange capacity. The use of a large amount of the aqueous medium causes the following disadvantages. For example, a large size of a reactor is needed. The operation for separation and a recovery of the copolymer are disadvantageous.

In the process of the invention, it is important to carry out the copolymerization under the pressure of higher than 7 kg/cm$^2$. When the pressure for the copolymerization is too low, it is difficult to maintain the reaction velocity for the copolymerization in enough high level and to produce the copolymer having high molecular weight. When the pressure for copolymerization is too low, the ion exchange capacity of the resulting copolymer is too high whereby the mechanical strength and the ion permselectivity are lowered by the increase of the water content.

The pressure for copolymerization is preferably selected from the range of less than 50 kg/cm$^2$, from the viewpoints of the reactor and the operations in the industrial process. Even though higher pressure for copolymerization can be employed, the effect of the invention is not proportionally improved by increasing the pressure. Accordingly, the pressure for copolymerization is usualy in a range of 7 to 50 kg/cm$^2$ preferably 9 to 30 kg/cm$^2$.

In the copolymerization of the invention, the reaction condition, the other condition and the operation are not specifically limited and can be selected from wide ranges. For example, the optimum reaction temperature for copolymerization can be selected depending upon the type of the polymerization initiator source, the aqueous medium or the molar ratio of the components in the reaction, etc. In usual, high or low temperature is not advantageous in the industrial process and accordingly, it is selected from the range of 20° to 90° C. preferably about 30° to 80° C.

Thus, it is preferable to select the polymerization initiator source which imparts high activity at the reaction temperature in the process of the invention.

It is possible to use ionized high energy radiation at room temperature, however, it is preferable to use an azo compound or a peroxy compound in the industrial process.

Suitable polymerization initiator sources are compounds having high activity at about 20° to 90° C. under the reaction pressure for copolymerization and include diacyl peroxides such as disuccinic peroxide, benzoyl peroxide, lauroyl peroxide and dipentafluoropropionyl peroxide; azo compounds such as 2,2′-azobis(2-aminopropane) hydrochloride, 4,4′-azobis(4-cyanovalerianic acid) and azobisisobutyronitrile; peroxyesters such as t-butyl peroxyisobutylate and t-butyl peroxypivalate; peroxydicarbonates such as diisopropyl peroxydicarbonate and di-2-ethylhexyl peroxydicarbonate; hydroperoxides such as diisopropylbenzene hydroperoxide; inorganic peroxides such as potassium persulfate and ammonium persulfate; and redox systems thereof.

In the process of the invention, the concentration of the polymerization initiator is usually in a range of 0.0001 to 3 wt. % preferably 0.001 to 2 wt. % to total monomers.

The molecular weight of the resulting copolymer can be increased and high ion exchange capacity is kept by decreasing the concentration of the polymerization initiator. When the concentration of the polymerization initiator is too high, the molecular weight of the copolymer is decreased to cause disadvantages for the production of the copolymer having high ion exchange capacity and high molecular weight.

It is possible to incorporate a desired conventional surfactant, a dispersing agent, a buffer agent and a molecular weight regulator used in the conventional polymerizations in an aqueous medium. It is also possible to incorporate an inert organic solvent such as a fluorinated or chlorofluorinated saturated hydrocarbon known as fluorocarbon solvents, which do not inhibit the copolymerization of the fluorinated olefin with the specific functional monomer and have not high chain transfer property.

In the process of the invention, it is preferable to carry out the copolymerization under controlling the concentration of the resulting copolymer to less than 40 wt. % preferably less than 30 wt. %. When the concentration is too high, the disadvantages of high load for stirring, difficulty of heat removal and insufficient absorption and diffusion of the fluorinated olefin gas are found.

The fluorinated copolymer obtained by the copolymerization in an aqueous medium is usually separated from the aqueous medium and is treated by the alcohol treatment. The post-treatment after the copolymerization is as follows.

When the functional monomer is liquid, the unreacted functional monomer is separated in an extraction by adding trichlorotrifluoroethane to the latex. Then, an acid such as hydrochloric acid or sulfuric acid is added to the latex to coagulate the copolymer. It is also possible to coagulate the copolymer by a conventional or known coagulating method such as a salt-out, a freezing coagulation and a mechanical coagulation. The coagulated polymer is washed with water and then, a water miscible organic solvent such as methanol and acetone is used to substitute water by it and then, the copolymer is washed with trichlorotrifluoroethane and is dried in air.

Methanol is added at a ratio of more than 100 ml. preferably 400 to 600 ml. per 100 wt. parts (g.) of the copolymer, and sulfuric acid is preferably added and the mixture is treated at higher than 20° C. for 1 to 50 hours. Then, the copolymer is separated from methanol. When sulfuric acid is added, the copolymer is washed with methanol to remove sulfuric acid. The copolymer is dried at 40° to 80° C. under a reduced pressure.

In accordance with the present invention, a fluorinated copolymer having ion-exchange groups which has high ion-exchange capacity, high molecular weight and excellent heat melt moldability can be advantageously obtained. For example, even though the functional monomer having $-COOR_1$ is used, a fluorinated copolymer obtained by a copolymerization in an aqueous medium has $T_Q$ of higher than 300° C. (non-post-treatment), and, $T_Q$ of the copolymer can be lowered to about 220° C. by the alcohol treatment with methanol etc. When the fluorinated copolymer having $T_Q$ of higher than 300° C. is used, it is not easy to carry out a heat melt molding so as to mold it into a film or a sheet. However, the fluorinated copolymer treated by the process of the present invention can be easily molded into a film or a sheet by a heat melt molding.

The copolymer of the invention can be processed to form a membrane by desired methods. For example, the functional group is converted to carboxylic acid group by the hydrolysis, if necessary. The hydrolysis can be carried out before or after the fabrication of a membrane. It is usually preferable to hydrolyze it after the fabrication of a membrane.

The fabrication of a membrane can be carried out by various methods such as heat melt molding method, a latex molding method, a casting method using a solvent solution of the copolymer and other known methods.

The cation exchange membranes made of the copolymers of the invention have excellent characteristics and can be used in various fields, various objects and various usages. For example, they can be preferably used in the field in which the anticorrosion is required, as a diaphragm for a diffusion dialysis, an electrolytic reduction and a fuel cell.

When it is used as a cation selective membrane for an electrolysis of alkali metal compound, high characteristics which could not be attained by using the conventional cation exchange membrane can be imparted.

Thus, in the case of the two compartment cell wherein an anode compartment and a cathode compartment are formed by partitioning the anode and the cathode with the cation exchange membrane made of the fluorinated copolymer of the invention, and an aqueous solution of an alkali metal chloride is fed into the anode compartment to electrolyze it to obtain an alkali hydroxide from the cathode compartment, it is possible to produce sodium hydroxide having high concentration of higher than 40% in high current efficiency of higher than 90% by electrolyzing an aqueous solution of sodium chloride having a concentration of higher than 2 N under the current density of 5 to 20 A/dm².

It is also possible to attain the electrolysis in low cell voltage of lower than 4.5 volts.

A further understanding can be obtained by reference to certain specific examples which are provided herein for purposes of illustration only and are not intended to be limiting unless otherwise specified.

EXAMPLE 1

In a 0.2 liter autoclave made of stainless steel, 100 g. of deionized water, 0.5 g. of $C_7F_{15}COONH_4$, 0.5 g. of $Na_2HPO_4.12H_2O$, 0.3 g. of $NaH_2PO_4.2H_2O$ and 0.026 g. of $(NH_4)_2S_2O_8$ were charged and then, 20 g. of $CF_2=CFO(CF_2)_3COOCH_3$ was further charged. The air in the autoclave was purged with liquid nitrogen and then, the mixture was heated to 57° C. Then, tetrafluoroethylene was fed to the pressure of 11.2 kg/cm² to initiate the reaction. During the reaction, tetrafluoroethylene was continuously fed into the system to maintain the pressure of 11.2 kg/cm². After 3.5 hours from the initiation, the unreacted tetrafluoroethylene was purged to finish the reaction. The unreacted monomer of $CF_2=CFO(CF_2)_3COOCH_3$ was separated in an extraction by adding trichlorotrifluoroethane to the latex. Then, hydrochloric acid was added to the latex to coagulate the resulting copolymer. The precipitated copolymer was washed with water and then methanol was added to substitute water and the copolymer was washed with trichlorotrifluoroethane and dried in air. 90 Ml of methanol was added to 18 g. of the copolymer and the mixture was stirred at 60° C. for 16 hours. The copolymer was separated from methanol and dried at 60° C. for 20 hours under a reduced pressure. The copolymer had $T_Q$ of 220° C. and 21 mole % of a content of the component of $CF_2=CFO(CF_2)_3COOCH_3$ (the component was measured by hydrolyzing the copolymer and titrating COOH groups). The copolymer was press-molded at 230° C. to obtain a desired film. The film was hydrolyzed to obtain a cation exchange membrane having an ion-exchange capacity of 1.47 meq/g polymer.

REFERENCE 1

In accordance with the process of Example 1 except that the treatment with methanol at 60° C. for 16 hours was eliminated the copolymerization and the post-treatment were carried out. The resulting copolymer had $T_Q$ of higher than 300° C. A desired film could not be obtained by a press-molding of the copolymer.

EXAMPLE 2

In a 0.2 liter autoclave made of stainless steel, 100 g. of deionized water, 0.2 g. of $C_8F_{17}COONH_4$, 0.5 g. of $Na_2HPO_4.12H_2O$ and 0.026 g. of $(NH_4)_2S_2O_8$ were charged and then, 20 g. of $CF_2=CFO(CF_2)_3COOCH_3$ was charged. Air was purged in vacuum and the mixture was heated to 55° C. and tetrafluoroethylene was charged to the pressure of 10.4 kg/cm² to initiate the reaction. During the reaction, tetrafluoroethylene was continuously fed into the system to maintain the pressure of 10.4 kg/cm². The reaction was completed for 3.3 hours. Then, sulfuric acid was added to the resulting latex to coagulate the resulting copolymer. The copolymer was separated by a filtration and throughly washed with water and then with acetone and with trichlorotrifluoroethane and then, dried in air. Methanol was added to the copolymer at a ratio of 5 times to the copolymer and the mixture was stirred at 45° C. for 35 hours. The copolymer was separated from methanol and dried at 60° C. for 20 hours to obtain 15.5 g. of a white copolymer. The copolymer had $T_Q$ of 225° C. and 20 mole % of a content of the component of $CF_2=CFO(CF_2)_3COOCH_3$. The copolymer was press-molded at 230° C. to obtain a desired film. The film was hydrolyzed to obtain a cation exchange membrane having an ion-exchange capacity of 1.42 meq/g. polymer.

When the treatment of the copolymer with methanol at 45° C. for 35 hours was eliminated, the resulting copolymer had $T_Q$ of higher than 300° C. A desired film could not be obtained by a press-molding of the copolymer.

EXAMPLE 3

In accordance with the process of Example 1 except adding 3 wt. parts of sulfuric acid to 100 wt. parts of methanol in the methanol treatment, the copolymerization and the post-treatment were carried out. The resulting copolymer had $T_Q$ of higher than 219° C. and a melt-stability of 0.98.

On the other hand, the copolymer obtained by the process of Example 1 wherein no sulfuric acid was added in the methanol treatment, had a melt-stability of 0.81.

EXAMPLE 4

In accordance with the process of Example 2 except adding 3 wt. parts of sulfuric acid to 100 wt. parts of methanol in the methanol treatment, the copolymerization and the post-treatment were carried out. The resulting copolymer had $T_Q$ of higher than 223° C. and a melt-stability of 0.95.

On the other hand, the copolymer obtained by the process of Example 2 wherein no sulfuric acid was added in the methanol treatment, had a melt-stability of 0.79.

EXAMPLE 5

In accordance with the process of Example 2 except using ethanol instead of methanol, the copolymerization and the post-treatment were carried out. The resulting polymer had $T_Q$ of 220° C. A desired film could be obtained by a press-molding of the copolymer at 230° C.

EXAMPLE 6

In accordance with the process of Example 2 except charging

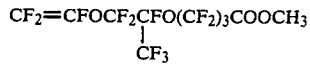

instead of $CF_2=CFO(CF_2)_3COOCH_3$ and copolymerizing at 55° C. under the pressure of 13 kg/cm², the copolymerization was carried out to obtain a copolymer having 16 mole % of a content of the component of

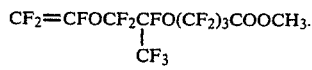

In accordance with the process of Example 2, the copolymer was treated with 5 times of methanol at 60° C. for 16 hours. The resulting polymer had $T_Q$ of 215° C. A desired film could be obtained by a press-molding of the copolymer at 220° C.

When the treatment of the copolymer with methanol was eliminated, the resulting copolymer had $T_Q$ of higher than 300° C. A desired film could not be obtained by a press-molding of the copolymer.

We claim:

1. A process for producing a fluorinated copolymer having ion-exchange groups, comprising:

copolymerizing a fluorinated ethylenic unsaturated monomer and a monomer having a carboxylic acid group or group convertible to a carboxylic acid group in an aqueous solution in the presence of a polymerization initiator:

treating the particles of copolymer product obtained with an alcohol at a temperature greater than 20° C.; and drying said alcohol treated particles, thereby substantially removing said alcohol from said particles.

2. The process according to claim 1, wherein the fluorinated copolymer is granular and said alcohol treatment is conducted by stirring said granular copolymer in a large amount of an alcohol at an elevated temperature.

3. The process according to claim 1, wherein said alcohol treatment is conducted by incorporating a small amount of an acid in an alcohol.

4. The process according to claim 1, wherein the functional monomer is a fluorovinyl compound having the formula

wherein p is 0 or 1; l is 0 to 3; m is 0 to 1; n is 0 to 12; X represents —F, —Cl or —CF₃; X' represents —F or —CF₃; Y and Y' each represent —F or a $C_{1-10}$ perfluoroalkyl group; A represents —CN, —COF, —COOH, —COOR₁, —COOM or —COONR₂R₃; R₁ represents a $C_{1-10}$ alkyl group; R₂ and R₃ each represent —H or R₁; M represents an alkali metal atom or a quaternary ammonium group.

5. The process according to claim 1, wherein the fluorinated ethylenic unsaturated monomer is a fluorinated olefin having the formula

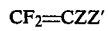

wherein Z and Z' each represent —F, —Cl, —H or —CF₃.

6. The process according to claim 4, wherein the fluorovinyl compound is a compound having the formula

wherein p is 0 or 1; l is 0 or 1; m is 0 to 1; n is 0 to 8; A represents —COF or —COOR₁ and R₁ represents a lower alkyl group.

7. The process according to claim 5, wherein the fluorinated ethylenic unsaturated monomer is tetrafluoroethylene.

8. The process according to claim 1 or 2 wherein said alcohol is a $C_1-C_5$ lower alcohol.

9. The process according to claim 1 wherein the time period for the alcohol treatment is in the range of 1 to 50 hours.

10. The process according to claim 1 or 2 wherein said alcohol is used in an amount of more than 100 ml. per 100 g. of the fluorinated copolymer.

11. The process according to claim 3 wherein the acid is incorporated in an amount of 1 to 5 wt. parts per 100 wt. parts of the fluorinated copolymer.

* * * * *